(12) United States Patent
Bonar et al.

(10) Patent No.: US 6,718,109 B1
(45) Date of Patent: Apr. 6, 2004

(54) OPTICAL WAVEGUIDE WITH A MULTI-LAYER CORE AND METHOD OF FABRICATION THEREOF

(75) Inventors: James Ronald Bonar, Erskine (GB); Richard Ian Laming, Edinburgh (GB)

(73) Assignee: Alcatel Optronics UK Limited, West Lothian (GB)

(*) Notice: Subject to any disclaimer, the term of this patent is extended or adjusted under 35 U.S.C. 154(b) by 0 days.

(21) Appl. No.: 10/110,087

(22) PCT Filed: Oct. 9, 2000

(86) PCT No.: PCT/GB00/03766

§ 371 (c)(1),
(2), (4) Date: Aug. 2, 2002

(87) PCT Pub. No.: WO01/25827

PCT Pub. Date: Apr. 12, 2001

(30) Foreign Application Priority Data

Oct. 7, 1999 (GB) .............................................. 9923598

(51) Int. Cl.⁷ ................................................. G02B 6/10
(52) U.S. Cl. ......................................... 385/131; 65/386
(58) Field of Search ........................... 385/14, 129–131, 385/141, 142, 144; 65/386

(56) References Cited

U.S. PATENT DOCUMENTS

| | | |
|---|---|---|
| 4,425,146 A | 1/1984 | Izawa et al. |
| 4,889,401 A | 12/1989 | Klement et al. |
| 4,929,302 A | 5/1990 | Valette |
| 4,988,156 A | 1/1991 | Shigihara |
| 5,206,925 A | 4/1993 | Nakazawa et al. |
| 5,299,276 A | 3/1994 | Okamura et al. |
| 5,416,884 A | 5/1995 | Hirata et al. |
| 5,438,639 A | 8/1995 | Ford et al. |
| 5,563,979 A | 10/1996 | Bruce et al. |
| 5,703,989 A | 12/1997 | Khan et al. |

FOREIGN PATENT DOCUMENTS

| | | |
|---|---|---|
| EP | 0 322 744 A2 | 7/1989 |
| EP | 0 323 317 A1 | 7/1989 |
| EP | 0 890 850 A1 | 1/1999 |
| GB | 2 312 525 A | 10/1997 |
| JP | 05 127032 A | 5/1993 |
| JP | 5-1882 31 A | 7/1993 |
| JP | 07 318734 A | 12/1995 |
| JP | 09 021922 A | 1/1997 |
| WO | WO 93/16403 A1 | 8/1993 |
| WO | WO 97/01782 A1 | 1/1997 |
| WO | WO 01/25827 A2 | 4/2001 |
| WO | WO 01/25829 A1 | 4/2001 |

OTHER PUBLICATIONS

Patent Abstracts of Japan, vol. 017, No. 448 (P–1594), Aug. 17, 1993, & JP 05 100123 A (Fujitsu Ltd.), Apr. 23, 1993.

Primary Examiner—David V. Bruce
Assistant Examiner—Thomas R Artman
(74) Attorney, Agent, or Firm—Sughrue Mion, PLLC (57) ABSTRACT

An optical waveguide (1) with a multi-layer core (6) comprises a substrate (2), a composite core waveguide (7) formed on the substrate (2) and at least one upper cladding layer (8) embedding said core waveguide (7). The core waveguide (7) is characterized by a composite core layer (6) comprising a first core layer (4) with a consolidation temperature $T_{1C}$ formed on the substrate (2) and at least one other core layer (5) formed on the first core layer (4), wherein the softening temperature $T_{2S}$ of at is least one of said at least one other core layers (5) is equal to or less than the consolidation temperature $T_{1C}$ of at least one underlying core layer (4, 5).

35 Claims, 5 Drawing Sheets

OPTICAL WAVEGUIDE WITH A MULTI-LAYER CORE AND METHOD OF FABRICATION THEREOF

This invention relates to an optical waveguide with a multi-layer core and in particular to an optical waveguide with a composite core in which the consolidation temperature of a first core layer is above the softening temperature of a second core layer deposited thereon.

Planar waveguides are fabricated by forming several layers on top of a substrate, usually a silicon wafer. In the case of a FHD fabrication process, the layers which make up the waveguide are first deposited as a layer of fine glass particles or "soot". Alternatively the glass can be deposited by a variety of other techniques, for example, plasma enhanced chemical vapour deposition (PECVD), low pressure chemical vapour deposition (LPCVD), which may be done in isolation or combination and further may be in combination with flame hydrolysis deposition (FHD).

In the case of the FHD process the soot layers are consolidated into denser glass layers, either individually immediately after each layer is deposited or several layers may be consolidated together. In the case of the other processes, although deposited as a glass a densification and/or desiccation procedure is often also employed. If a layer is heated to a sufficiently high temperature in excess of its consolidation temperature, the viscosity of the consolidated layer is reduced until eventually the glass is able to flow. When this occurs, surface irregularities can be removed as the surface of the layer is smoothed.

During fabrication of an optical planar waveguide, it is know to consolidate a core layer using a temperature cycle in which at one stage the layer is heated to the "softening" temperature, which is significantly higher than the actual consolidation temperature. This enhanced temperature stage ensures that the glass forming the core layer is sufficiently softened at its top surface for the consolidated core layer to flow and form a relatively smooth and level layer.

The smoother the surface of a waveguide the less light is scattered at the surface; heating a layer to its softening temperature for a period of time is therefore desirable if a high-quality waveguide is to be fabricated. However, to ensure that the underlying layers are not deformed during the consolidation and/or softening of subsequent layers, the consolidation and softening temperatures of each subsequent layer are usually less than the softening temperature of the underlying layer.

In order to achieve a suitably smooth core layer upper surface, without reaching temperatures which exceed the consolidation temperatures of the underlying layers and/or which could cause thermal deformation of the waveguide's substrate, it is usually desirable to introduce selected dopants into the core layer during the deposition stage.

In the present invention the composition of the glass forming the lowest core layer is thus selected so that its refractive index is close to that of the overlying core layer(s) whilst its consolidation temperature is greater than the softening temperature of the topmost overlying core layer. Similarly, the cladding formed around the core layers and under the core layers must have the correct thermal characteristics to ensure that the core is not deformed during fabrication of the waveguide.

As a consequence all layers (buffer if employed, core and cladding) must be deposited with decreasing consolidation temperature and sufficient buffer in between each. In addition, the maximum consolidation temperature allowed, typically for the core layer, is limited to ~1360° C. by the onset of striations and implosions due to the silicon substrate.

The selected core dopants lower the temperature at which the top surface of the core layer begins to f low. For example, dopants such as boron, phosphorous and/or titanium ion species may be introduced into germano silicate glass during the deposition stage in selected quantities to give the desired properties, for example; the right thermal characteristics, refractive index and coefficient of expansion. Other co-dopants could include tantalum, aluminium, lanthanum, niobium and zirconium. Germano silica based core glass is the preferred example but germania may not be necessary in all cases.

The invention seeks to provide several advantages in the fabrication of an optical waveguide. The waveguide according to the invention has a composite core in which a first layer comprises a glass whose consolidation temperature is close to the maximum allowed (~13600° C.). A "skinning" layer is then deposited on top of the underlying core layer(s) whose thickness is only of the order of ten percent of the thickness of the underlying core layer(s). Generally, the "skinning" layer has a much increased dopant concentration but match the refractive index of the underlying core layer(s). This uppermost "skinning" layer typically has a consolidation temperature ~50° C. less than the consolidation temperature(s) of the underlying core layer(s). The uppermost "skinning" layer fully consolidates and, due to its softening temperature being lower than the consolidation temperature(s) of the underlying core layer(s), is further softened. This promotes a surface "skinning effect" which gives rise to a low surface roughness. The region of increased dopant is thus minimised, and is located, for example, at the edge of the waveguide core where the optical field of the guided mode is minimised: the impact of any density fluctuations is thus reduced.

In order to ensure that both the consolidation and the softening temperatures of the core layer are sufficiently low, the core layer needs to be quite heavily doped. At such high levels of concentration, the dopants are more susceptible to non-uniform distribution within the core layer, and this results in the core layer exhibiting an undesirably high level of density fluctuations. The presence of density fluctuations affects the consistency of the refractive index across the layer, which should be as uniform as possible if the waveguide is to be used in large scale applications, for example, such as an array waveguide grating. The minimisation of such density fluctuations is particularly desirable in the fabrication of large-scale waveguides, for example, waveguides whose dimensions are in excess of $2 \times 2$ $\mu m^2$.

Furthermore, when cladding the core, since the volume of the softer core glass is minimised a closer match in consolidation temperature between the clad and core layers can be employed before significant deformation of the core layer is observed.

During the consolidation phase, there is a reduction in surface area whilst at the same time an increase in density of the deposited layer. Necking between the deposited soot particles forms an open network with pores, which subsequently densifies with closure of the pores. Thus, it is essential that the consolidation conditions employed ensure that the lower viscosity uppermost (or "skinning" layer) does not consolidate prematurely.

Poor consolidation conditions may give rise to gas trapping problems which would damage the consolidating layer (s). To mitigate this, a suitable consolidation ramp temperature rate, such as for example 5° C./min, may be used which enables the consolidating layer to be formed bubble free. He gas can also be used as it aids sintering by promoting core collapse.

The present invention seeks to obviate or mitigate the aforementioned disadvantages by providing a waveguide with a multi-layer core which has a uniform refractive index and a smooth uppermost surface.

A first aspect of the invention seeks to provide an optical waveguide with a multi-layer waveguide core, the waveguide comprising:

a substrate;

a waveguide core formed on the substrate; and at least one upper cladding layer embedding said waveguide core, the waveguide core having a composite core layer comprising:

a first core layer with a softening temperature $T_{1S}$ formed on the substrate; and at least one other core layer formed on the first core layer, wherein the softening temperature $T_{2S}$ of at least one of said at least one other core layers is less than the softening temperature $T_{1S}$ of an underlying core layer.

Preferably, the softening temperature $T_{2S}$ of at least one of said at least one other core layers is at least 10° C. less than the softening temperature $T_{1S}$ of a least one underlying core layer.

Preferably, the softening temperature $T_{2S}$ of at least one of said at least one other core layers is substantially equal to or less than a consolidation temperature $T_{1C}$ of at least one underlying core layer.

Preferably, said substrate is silicon.

Preferably, said substrate further comprises at least one buffer layer formed thereon.

Preferably, at least one said buffer layer is a thermally oxidised layer of the substrate.

Preferably, at least one layer of said: first core layer, said at least one other core layer, and/or said at least one upper cladding layer comprises silica and/or germanium oxide.

More preferably, at least one of said first core layer, said at least one other core layer, and/or said at least one upper cladding layer is doped with at least one ion species taken from the group consisting of:

phosphorus, boron, titanium, tantalum, aluminium, lanthanum, niobium, zirconium and/or any other transition element.

More preferably, said at least one silica and/or germanium oxide layer is doped with at least one species taken from the group consisting of:

a transition element, a rare earth ion species and/or a heavy metal ion species.

Preferably, the thickness of first core layer is greater than the thickness of said at least one other core layer.

More preferably, the thickness of the first core layer is the major portion of the thickness of the composite core layer.

According to a second aspect of the invention, there is provided a method of fabricating an optical waveguide with a waveguide core comprising the steps of:

forming a substrate;

forming a composite core layer on said substrate;

forming a waveguide core from said composite core layer; and forming at least one upper-cladding layer to embed said core waveguide, wherein the formation of the composite core layer is characterised by:

forming a first core layer with a softening temperature $T_{1S}$ on the substrate; and forming at least one other core layer on the first core layer, wherein the softening temperature $T_{2S}$ of at least one of said at least one other core layer is substantially less than the softening temperature $T_{1S}$ of at least one underlying core layer.

Preferably, the softening temperature $T_{2S}$ of at least one of said at least one other core layer is at least 10° C. less than the softening temperature $T_{1S}$ of at least one underlying core layer.

More preferably, the softening temperature $T_{2S}$ of at least one of said at least one other core layer is substantially equal to or less than a consolidation temperature $T_{1C}$ of at least one underlying core layer.

Preferably, at the softening temperature $T_{2S}$ of the said at least one other core layer, the viscosity of the said at least one other core layer is sufficiently reduced to lessen surface irregularities in said at least one other core layer.

Preferably, said step of forming a substrate includes the formation of at least one buffer layer on said substrate.

Preferably, the formation of at least one of: said at least buffer layer, said first core layer, said at least one other core layer, and said upper cladding layer comprises the steps of:

depositing a soot layer of fine particulate material;

consolidating said deposited soot layer.

Preferably, said soot deposition is by a flame hydrolysis deposition process, and/or any other planar soot deposition technique or combination of soot depositing techniques and non-soot depositing techniques.

More preferably, said consolidation is by heating with a flame hydrolysis burner and/or in a furnace.

Preferably, the formation of at least one of: said at least buffer layer, said first core layer, said at least one other core layer, and said upper cladding layer comprises the steps of:

depositing said layers of material by means of a plasma enhanced chemical vapour deposition process, a low pressure chemical vapour deposition process and/or any other planar deposition technique or combination of deposition techniques;

subjecting the deposited layer to a temperature controlled environment such that said deposited layer is sintered.

Preferably, the composition of at least one layer of said: first core layer, at least one other core layer, and/or said at least one upper cladding layer includes silica and/or germanium oxide.

More preferably, at least one layer of said: first core layer, said at least one other core layer, and/or said at least one upper cladding layer is doped with at least one ion species taken from the group consisting of:

phosphorus, boron, titanium, tantalum, aluminium, lanthanum, niobium, zirconium and/or any other transition element.

Preferably, at least one silica and/or germanium oxide layer is doped at least one ion species taken from the group consisting of:

a transition element, a rare earth ion species and/or a heavy metal ion species.

Preferably, the quantities of dopant are selected to form a waveguide with a refractive index difference of between 0.2–2% with respect to the buffer.

The lower core layer may be $SiO_2$ co-doped with a Germanium and/or Boron and/or Phosphorus ion species. The upper core may be $SiO_2$ co-doped with a Germanium and/or a Boron and/or a Phosphorus ion species.

Preferably, the softening temperature $(T_{2S})$ of the said at least one other core layer is at least 10° C. less than the consolidating temperature $(T_{1C})$ of said first core layer.

The consolidation temperature $(T_{1C})$ of said first core layer may be in the range 1200° C.–1375° C.

Preferably, the consolidation temperature $T_{2C}$ of the second core layer is between 1100° C. to 1365° C.

Preferably, the composition and concentration of dopants in any one lower layer and/or substrate is selected to control the degree of softness exhibited by any overlying layer at a predetermined temperature.

Preferably, during the consolidation, the temperature conditions include a stage where the temperature gradient rises at 15° C. min$^{-1}$ between 650° C. to 850° C.

Preferably, during the consolidation, the temperature conditions include a stage where the temperature gradient rises at 5° C. min$^{-1}$ between 850° C to 1375° C., and the dopant concentrations are selectively controlled so that thermal deformation is minimised over this temperature range.

Preferably during the consolidation, the temperature conditions include a stage where the temperature gradient falls at 5° C. min$^{-1}$ between 1375° C. to 650° C.

Preferably, during the consolidation stage of at least one layer of said cladding layer, said first core layer and/or said second core layer overlying a doped substrate and/or another doped layer, the temperature s conditions include a stage where the temperature remains above the softening temperature of the underlying substrate and/or other layer in its undoped state for at least 60 minutes.

The present invention will be further illustrated by way of example, with reference to the accompanying drawings in which.

Figure 1:
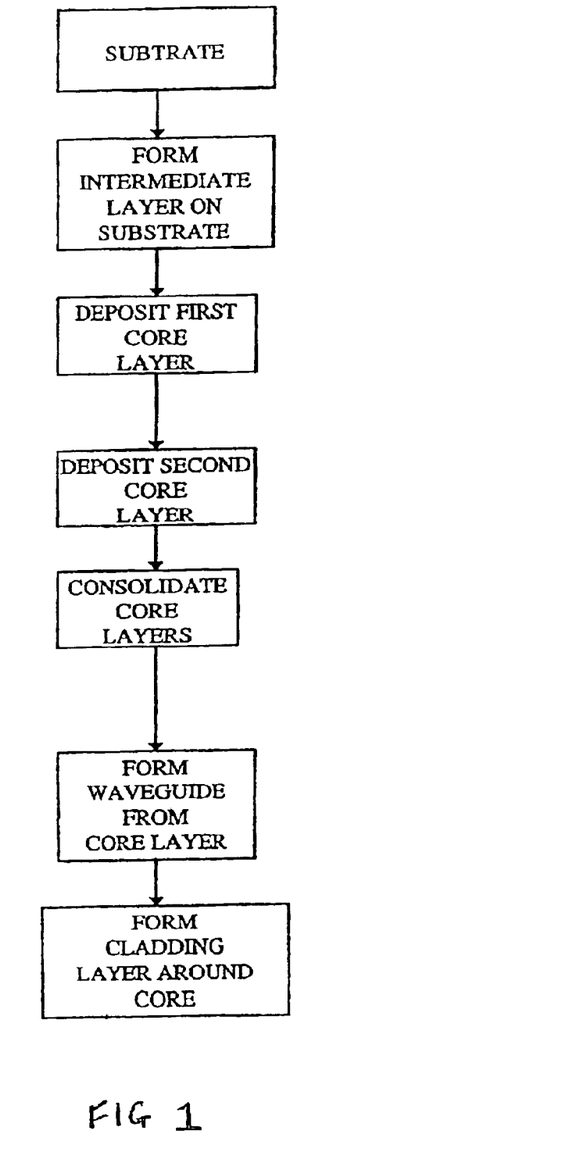
FIG. 1 is a flow chart illustrating the fabrication steps of an optical channel waveguide according to a preferred embodiment of the invention.

Referring to the drawings, FIG. 1 illustrates the fabrication steps according to an embodiment of the invention of a method of forming an optical waveguide with a multi-layer core. FIG. 1 illustrates the main steps of fabrication and is not intended to completely delimitate the fabrication process. Conventional, interim steps have been omitted.

Referring to FIGS. 2A to 2D, the method of fabricating an optical waveguide 1 with a multi-layer core is shown.

Figure 2A:
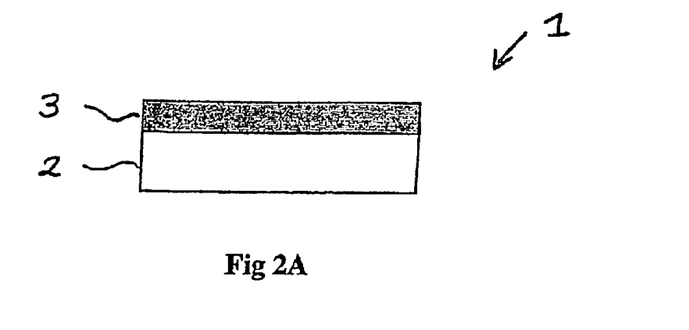
FIGS. 2A to 2D are schematic diagrams showing the formation of an optical channel waveguide according to a preferred embodiment of the invention.

FIG. 2A, shows an buffer layer 3, for example a buffer or under-cladding layer, is formed on top of a substrate 2. In this example, the buffer layer 3 is silica ($SiO_2$) formed by thermally oxidising a silicon substrate. Alternatively, more than one buffer layer 3 may be formed by any suitable process, for example, depositing and consolidating a glass soot as described herein below in the description of the formation of the upper-cladding layer 8.

Figure 2B:
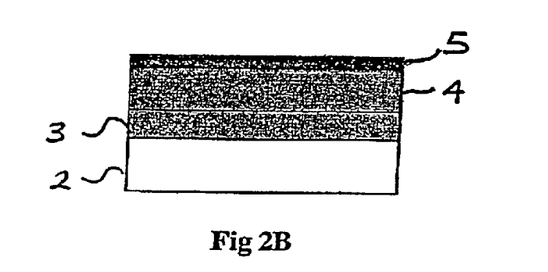

Referring now to FIG. 2B, a first core layer 4 is formed on top of the buffer layer 3. The first core layer 4 is deposited using a suitable deposition process, for example, a flame hydrolysis deposition (FHD) process. Other suitable deposition processes include, for example, plasma enhanced chemical vapour deposition (PECVD) and low pressure chemical vapour deposition (LPCVD) or a combination of deposition processes.

In the FHD process, a soot layer of fine, particulate glass material (s) is deposited on top of the buffer layer 3. If, for example, a 6 μm core layer is to be ultimately formed, sufficient glass material is initially deposited to give rise to the formed first core layer 4 having a thickness of 5.5 μm.

The glass material is typically silicon and/or germanium oxides, for example $SiO_2$ and/or $GeO_2$. In the preferred embodiment of the invention, the glass material is doped during the deposition stage. Typical dopants, chosen for their effect on the thermal characteristics, refractive index and coefficient of expansion of the layer are selected quantities of, for example, boron, phosphorus, and/or titanium compounds ($B_2O_3$, $P_2O_5$, $TiO_2$) inter alia other ion species.

The composition of the glass forming the first core layer 4 is selected to have a consolidation temperature close to approximately 1360° C., or close to the maximum possible.

Certain characteristics of the glass are enhanced by introducing heavier dopant species, such as other transition elements, rare earths and/or heavy metals, which may be introduced using specialised techniques, for example an aerosol doping technique such as disclosed in United Kingdom Patent Application No. 9902476.2.

Still referring to FIGS. 1 and 2B, a second core layer 5 is formed on the first core layer 4. The second core layer 5 is deposited using any suitable deposition technique, for example FHD, on top of the first core layer 4. In one embodiment of the example, the second core layer has a much shallower depth than the first core layer as it is desirable to keep the glass material forming the second core layer 5 to a small fraction of the total core composition. It is sufficient to deposit sufficient material to form only a surface "skin" over the underlying first core layer 4 when the second core layer 5 is consolidated and softened. In one embodiment of the invention, where a 6 μm deep core layer is being formed, the second core layer has a consolidated depth of 0.5 μm.

The glass forming the second core layer 5 has a different composition from the first core layer 4. By varying, normally increasing, the dopant concentrations and/or suitably selecting the dopant species of the second core layer 5, the softening temperature $T_{2S}$ of the second core layer 5 can be sufficiently reduced. The softening temperature of a layer is the temperature at which the viscosity of the consolidated layer is reduced sufficiently for the consolidated layer to begin to 'flow', which, for example, can smooth out any surface irregularities of the layer. Reducing $T_{2S}$ by selectively doping the constituent glass material forming the second core layer 5 ensures the second core layer 5 has already reached its consolidation temperature $T_{2C}$ and further has reached its softening temperature $T_{2S}$ as the underlying first core layer 4 is consolidating. The consolidation temperature $T_{2C}$ and the softening temperature $T_{2S}$ of the second core layer are thus both below the consolidation temperature $T_{1C}$ of the first core layer 4. This results in the second core layer 5 beginning to flow to form a smooth surface during the consolidation phase.

The glass material used to form the second core layer 5 further produces the desired effect of, for example, matching the refractive index of the first core layer 4 to the second core layer 5. Thus by heating both the first and second core layers 4,5, the second core layer 5 will soften and flow as the first core layer consolidates which reduces the surface roughness at the interface between the two core layers 4, 5 as well as the topmost surface of the composite core layer 6.

It is desirable for the softening temperature of the second core layer to be in the temperature range over which the first core layer consolidates.

Referring now to the embodiment outlined in FIG. 1, the second core layer 5 is deposited before the first core layer 4 is consolidated. Alternatively, the second core layer 5 may be deposited when the first core layer 4 is partially consolidated. In the embodiment of the invention shown in FIG. 1, both core layers 4 and 5 are initially deposited by an FHD process and are fully consolidated together to form a composite core layer 6. Alternatively, each core layer 4,5 could be deposited and consolidated separately to form the composite core layer 6.

Figure 2C:
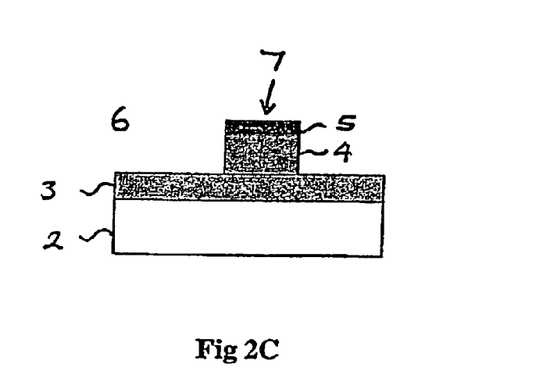

Referring now to FIG. 2C, once the composite layer 6 has been formed, a waveguide core 7 is formed by using any suitable etching technique (s), for example photolithographic process (es) and dry etching, to remove unwanted portions of the core layers 4,5. The remaining composite core layer 6 forms the waveguide core 7 which is then embedded in an upper-cladding layer 8.

Figure 2D:
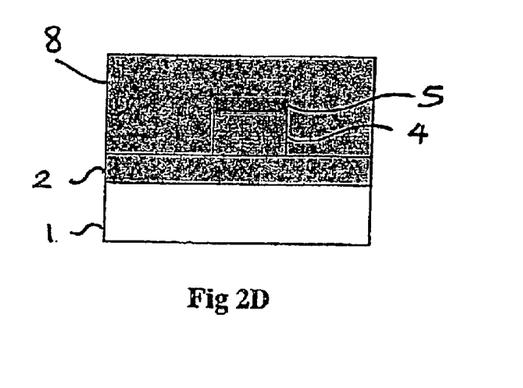

Referring now to FIG. 2D, the upper-cladding layer 8 is formed by depositing a suitable glass material around the waveguide core 7 using any suitable deposition process, for example FHD, as described hereinbefore. The composition of the upper-cladding layer 8 may be varied by introducing dopants in order for the upper cladding layer 8 to possess certain desirable characteristics. For example, in the preferred embodiment of the invention the upper cladding layer 8 has the same refractive index as the refractive index of the buffer layer 3, and has a consolidation temperature $T_{UC}$ which is lower than that of the softening temperatures $T_{1S}$ and $T_{2S}$ of the first and second core layers 4,5. Additionally, the expansion coefficient of the upper cladding layer 8 should be similar to that of the substrate.

Generally, to ensure that the consolidation of any one layer does not cause any thermal deformation of the underlying layer(s) and substrate 2, each layer of a waveguide possesses the desired characteristic that its consolidation temperature is less than the softening temperature of the previous layer. Alternatively, for example, buffer layers can be formed in between each layer of the waveguide to act as a thermal barrier.

Each of the first and second core layers 4,5 is consolidated using a temperature cycle which includes a stage at a temperature significantly above the actual consolidation temperature. By subjecting the first and second core layers 4,5 to such an extreme temperature, the core layer with the lowest viscosity will flow so that it forms a relatively smooth and even surface. The high temperatures required to consolidate the composite core layer 6 may be achieved by known techniques, for example, passing a burner flame from a flame hydrolysis burner over the deposited soot layer or by placing the waveguide 1 in a suitable furnace.

In one embodiment, to ensure that the uppermost surface of the core composite layer 6 is as smooth as possible, the second core layer 5 is heavily doped to reduce its consolidation temperature $T_{2C}$ and softening temperature $T_{2S}$ to below the consolidation temperature $T_{1C}$ of the first core layer 4. The general effect of the concentration of dopants in a layer with respect to the softening temperature is illustrated in FIG. 5.

Figure 3:
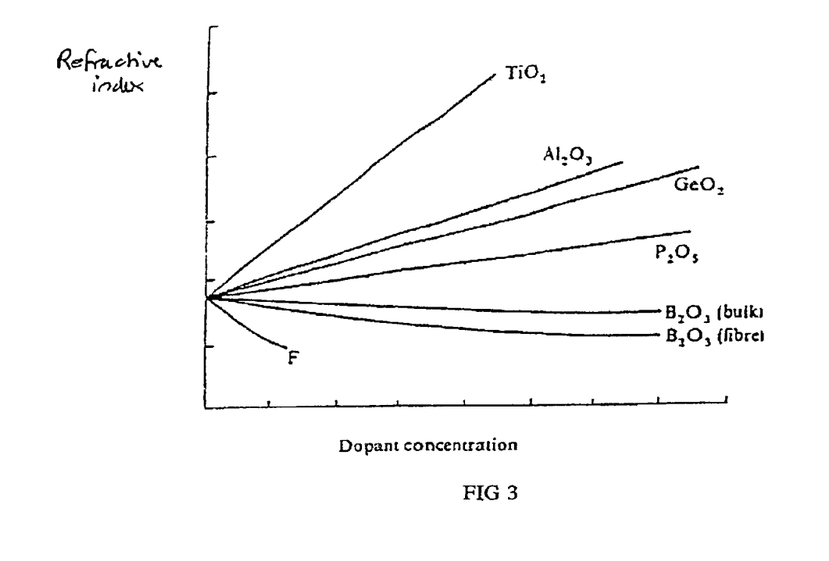
FIG. 3 illustrates the variation of the refractive index of the dopants $TiO_2$, $Al_2O_3$, $GeO_2$, $P_2O_5$, $B_2O_3$, and F as a function of the dopant concentration.
Figure 4:
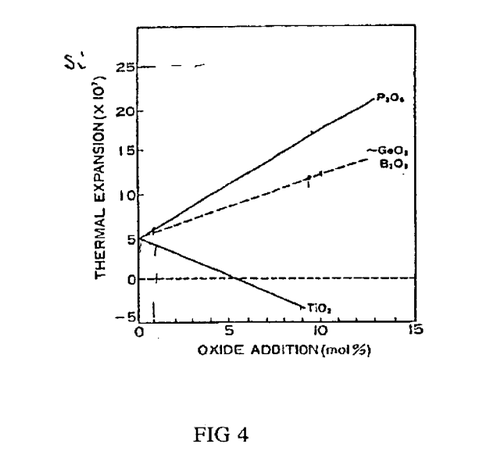
FIG. 4 illustrates the variation in the coefficient of expansion of an $SiO_2$ layer as the dopant concentration of $GeO_2$, $P_2O_5$, $B_2O_3$, an $TiO_2$ increases.
Figure 5:
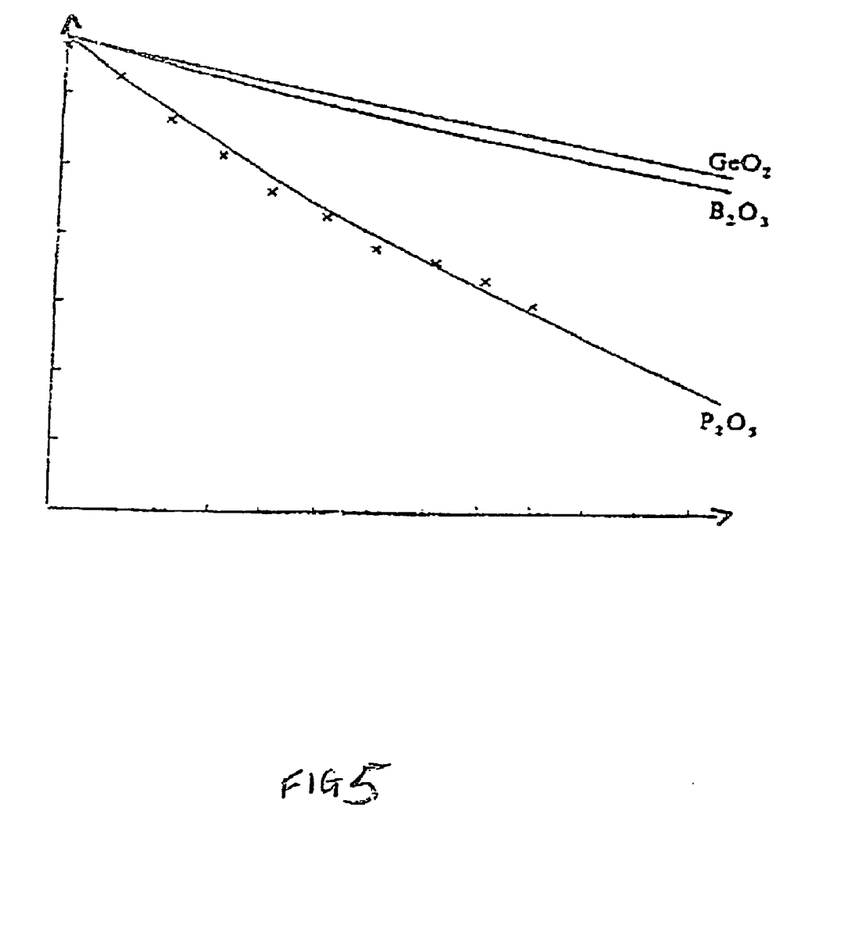
FIG. 5 illustrates the variation of the softening temperature of the dopant concentration of $GeO_2$, $P_2O_5$, $B_2O_3$.

FIG. 5 indicates that the higher the concentration of phosphorus, boron and germanium oxide in a layer, the lower the softening temperature. However, the presence of such dopants also affects the refractive index of a layer as is illustrated in FIG. 3. This illustrates that increasing the quantity of phosphorus and germanium oxide increases the refractive index, whereas the presence of boron oxide tends to reduce it.

To ensure that the second core layer 5 has a minimal detrimental effect on the uniformity of the refractive index of the waveguide 7 formed from the composite core layer 6, the thickness of the second core layer 5 is less than the thickness of the first core layer 4. In the preferred embodiment of the invention, for a composite core layer 6 with a total thickness of 6 µm, the thickness of the first core layer 4 is 5.5 µm and the thickness of the second core layer 5 is 0.5 µm. In other preferred embodiments of the invention, the thickness of the second core layer 5 is around 10% of the total thickness of the composite core layer 6.

The consolidation temperature of the first core layer 4 is increased by selecting suitable dopant concentrations to ensure the consolidation temperature $T_{1C}$ of the first core layer 4 exceeds the softening temperature $T_{2S}$ of the second core layer 5. Thus by selecting suitable quantities of dopant in each of the core layers 4,5 it is possible to obtain the desired effect $$T_{1C} > T_{2S} > T_{2C}.$$

In the preferred embodiment of the invention, the first core layer 4 has a composition which is selected to give a consolidation temperature $T_{1C}$ near 1360° C. The composition of the second core layer 5 is such that the consolidation temperature $T_{2S}$ and the softening temperature $T_{2S}$ of the second core layer 5 are below the consolidation temperature $T_{1C}$ of the first core layer 4.

For example, in one embodiment of the invention, the second core layer 5 is selectively doped with a higher concentration of $GeO_2$ and $B_2O_3$ so that its consolidation temperature $T_{2C}$ is reduced to at least 50° C. less than the consolidation temperature $T_{1C}$ of the first core layer 4. Furthermore, the softening temperature so the second core layer is reduced to at least 10° C. less than the consolidation temperature $T_{1C}$ of the first core layer 4.

The composition of the second core layer 5 is further selected so that its refractive index is substantially equal to the refractive index of the first core layer 4.

Figure 6A:
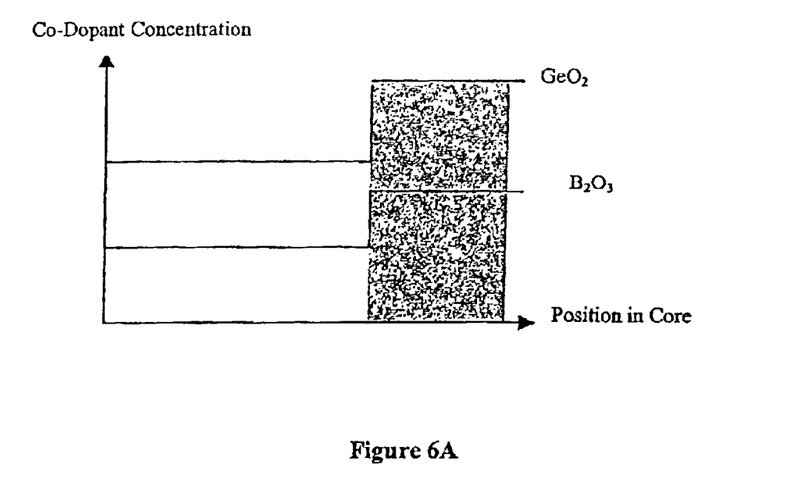
FIG. 6A is a schematic illustration which shows the variation of the codopant concentration as a function of position in the core layer.
Figure 6B:
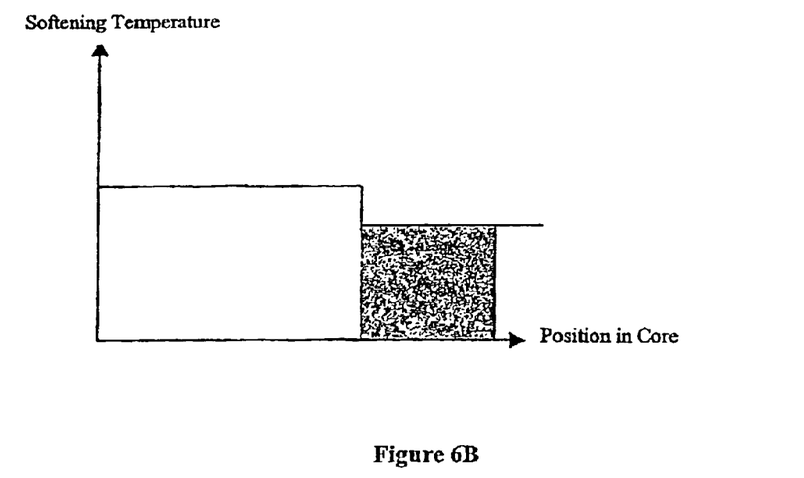
FIG. 6B is a schematic illustration which shows the variation of the softening temperature of the core as a function of position in the core layer.

FIG. 6A sketches the composite core layer 6 and dopant concentration levels in an embodiment of the invention. The area forming the second core layer 5 is shaded on the plot. The lower line represents the variation of the concentration of boron oxide ($B_2O_3$), the upper line represents the variation of the concentration of germanium oxide ($GeO_2$). The concentrations of boron oxide and germanium oxide increase in the second core layer 5 compared to their concentrations in the first core layer 4. This achieves a suitable reduction in the softening temperature $T_{2S}$ of the second core layer 5, as FIG. 6B illustrates without radically affecting the overall refractive index of the composite core layer 6.

When the composite core layer 6 is consolidated at the consolidation temperature of the first core layer 4, the first core layer 4 and the second core layer 5 are both fully consolidated. However, $T_{1C}$ is greater than $T_{2S}$, and as the second core layer 5 is heated to above its softening temperature $T_{2S}$, its viscosity is sufficiently reduced for its uppermost surface to flow. This effect, the "surface skinning" of the second core layer 5, gives the composite core layer 6 a desirably low surface roughness itself and further, a low surface roughness to the interface between the first and second core layers. Furthermore, the detrimental effects of the high concentrations of dopant required to reduce the softening temperature are mitigated as there is no need for high dopant concentrations to be present throughout the composite layer 6.

It is desirable for the consolidation of the second core layer 5 not to occur prematurely, as this could result in gas being potentially trapped between the first and second core layers of the composite core layer 6. Gas may become trapped during premature consolidation as follows: the deposited soot particles initially form an open network with pores; as the pores close during the is consolidation process, the layers become increasingly dense and gas pockets are expelled. If the pore network of the second core layer 5 is fully collapsed before the pore network of the first core layer 4 has collapsed, gas emitted from the first core layer 4 may be trapped beneath the second core layer 5.

To prevent premature consolidation of the second core layer 5, the temperature range over which the composite core 6 is heated includes a typical consolidation ramp rate of 5° C. min$^{-1}$. This removes the possibility of the second core layer prematurely consolidating and trapping gas bubbles. Other means to promote pore collapse may also be used, for example, He gas may be included during the consolidation phase to promote core collapse.

In the preferred embodiment of the invention, the first core layer 4 may be formed with a refractive index of 0.7% of the buffer layer 3 by using the following gas flows during the FHD process stage:

| First core layer | | Second core layer | |
|---|---|---|---|
| Bubbler Gas | Flow Rate (sccm) | Bubbler Gas | Flow Rate (sccm) |
| SiCl$_4$ | 150 | SiCl$_4$ | 150 |
| GeCl$_4$ | 101 | GeCl$_4$ | 156 |
| BCl$_3$ | 49 | BCl$_3$ | 65 |
| Transport Gases | Flow Rate | Transport Gases | Flow Rate |
| H$_2$:O$_2$ | 5 Lmin$^{-1}$:7 Lmin$^{-1}$ | H$_2$:O2 | 5 Lmin$^{-1}$:7 Lmin$^{-1}$ |

The above composition is purely illustrative. The invention seeks to provide a refractive index for the first core layer 4 which is substantially the same refractive index for the second core layer 5, the composition of both core layers 4,5 being such that index matching can be achieved without any substantial thermal deformation occurring to the first core layer 4 during the consolidation and/or fabrication of the second core layer 5. In this example, the composition of the material is selected to provide a refractive index difference of approximately 0.7%, with the second layer having substantially the same refractive index.

The temperature cycle for this embodiment is as follows during consolidation of the composite core layer 6:

| | |
|---|---|
| 650° C. to 850° C. | 15° C. min$^{-1}$ |
| 850° C. to 1375° C. | 5° min$^{-1}$ |
| 1375° C. to 650° C. | -5° min$^{-1}$ |

The core layer 6 remains at the peak temperature for 80 minutes in an helium oxygen atmosphere (0.6 L min$^{-1}$ He and 0.2 L min$^{-1}$ O$_2$) before being cooled to 650° C. at -5° C. min$^{-1}$. Consolidation of the first layer occurs for T$_{1C}$ between 1200° C. and 1375° C. Consolidation of the second layer occurs over a lower range: T$_{2C}$ between 1100° C. and 1365° C.

While several embodiments of the present invention have been described and illustrated, it will be apparent to those skilled in the art once given this disclosure that various modifications, changes, improvements and variations may be made without departing from the spirit or scope of this invention.

More than two core layers may be formed in the multi-layer core, and the composition of each core layer is selected so that joint or separate consolidation can occur but so that the surface layer of the topmost core layer is subjected to skinning without the risk of thermal deformation of any of the underlying layers or any decrease in the overall uniformity and/or quality of the density/refractive index of the composite core. Accordingly, the composition of each core layer can be selected to achieve the aforementioned advantages.

Any range given herein may be extended or altered without losing the effects sought, as will be apparent to the skilled person for an understanding of the teachings herein.

What is claimed is:

1. An optical waveguide (1) with a multi-layer waveguide core (7), the waveguide (1) comprising;
    a substrate (2);
    a waveguide core (7) formed on the substrate (2); and
    at least one upper cladding layer (a) embedding said waveguide core (7), the waveguide core (7) having been etched from a composite core layer (6) and comprising:
        a first core layer (4) with a softening temperature T$_{1S}$ formed on the substrate (2); and
        at least one other core layer (5) formed on the first core layer (4), wherein the softening temperature T$_{1S}$ of at least the uppermost one of said at least one other core layers (5) is less than the softening temperature T$_{1S}$ of an underlying core layer (4,5) which has a greater thickneses than said uppermost core layer.

2. An optical waveguide (1) as claimed in claim 1, wherein the softening temperature T$_{2S}$ of said uppermost one of said at least one other core layers (5) is at least 10° C. less than the softening temperature T$_{1S}$ of at least one underlying core layer (4, 5).

3. An optical waveguide (1) as claimed in claim 1, wherein the softening temperature T$_{2S}$ of said uppermost one of said at least one other core layers (5) is less than or substantially equal to a minimum consolidation temperature T$_{1C}$ of at least one underlying core layer (4, 5).

4. An optical waveguide (1) as claimed in claim 1 wherein said substrate (2) is a silicon wafer.

5. An optical waveguide (1) as claimed in claim 4, wherein said substrate (2) further comprises at least one buffer layer (3) formed thereon.

6. An optical waveguide (1) as claimed in claim 5, wherein at least one of said at least one buffer layer (3) is a thermally oxidised layer of the substrate (2).

7. An optical waveguide (1) as claimed in claim 1, wherein at least one layer of said: first core layer (4), said at least one other core layer (5), and/or said at least one upper cladding layer (8) comprises silica and/or germanium oxide.

8. An optical waveguide (1) as claimed in claim 1, wherein at least one layer of said: first core layer (4), said at least one other core layer (5), and/or said at least one upper cladding layer (8) is doped with at least one ion species taken from the group consisting of:
    phosphorus, boron, titanium, tantalum, aluminum, lanthanum, niobium, zirconium and/or any other transition clement.

9. An optical waveguide (1) as claimed in claim 4, wherein said at least one silica and/or germanium oxide layer is doped with at least one species taken from the group consisting of:
    a transition element, a rare earth ion species and/or a heavy metal ion species.

10. An optical waveguide (1) as claimed in claim 1 wherein the thickness of first core layer (4) is greater than the thickness of said at least one other core layer (5).

11. An optical waveguide (1) as claimed in claim 8, wherein the thickness of the first core layer (4) is the major portion of the thickness of the composite core layer (6).

12. An optical waveguide (1) as claimed in claim 1, wherein said underlying core layer (4, 5) has substantially equal refractive index to the uppermost core layers.

13. A method of fabricating an optical waveguide (1) with a waveguide core (7) comprising the steps of:
   forming a substrate (2);
   forming a composite core layer (6) on said substrate;
   etching a waveguide core (7) from said composite core layer (6); and
   forming at least one upper-cladding layer (8) to embed said core waveguide (7), wherein the formation of the composite core layer (6) is characterised by:
      forming a first core layer (4) with a softening temperature $T_{1S}$ on the substrate (2); and
      forming at least one other core layer (5) on the first core layer (4), wherein the softening temperature $T_{2S}$ of at least the uppermost one of said at least one other core layer (5) is less than the softening temperature $T_{1S}$ of at least one underlying core layer (4,5) which has a greater thickness than said uppermost core layer.

14. A method as claimed in claim 13, wherein the softening temperature $T_{2S}$ of said uppermost one of said at least one other core layer (5) is at least 10° C. less than the softening temperature $T_{1S}$ of at east one underlying core layer (4,5).

15. A method as claimed in claim 13, wherein the softening temperature $T_{2S}$ of said uppermost one of said at least one other core layer (5) is less than or substantially equal to a minimum consolidation temperature of $T_{1C}$ of at least one underlying core layer (4, 5).

16. A method as claimed in claim 13, wherein at the softening temperature $T_{2S}$ of the said at least one other core layer (5), the viscosity of the said at least one other core layer (5) is sufficiently reduced to lessen surface irregularities in said at least one other core layer (5).

17. A method as claimed in claim 13, wherein said step of forming a substrate (2) includes the formation of at least one buffer layer (3) on said substrate (2).

18. A method as claimed in claim 13, wherein the formation of at least one of: said at least one buffer layer (3), said first core layer (4), said at least one other core layer (5), and said upper cladding layer (8) comprises the steps of:
   depositing a soot layer of fine particulate material;
   consolidating said deposited soot layer.

19. A method as claimed in claim 13, wherein said soot deposition is by a flame hydrolysis deposition process, and/or any other planar soot deposition technique or combination of soot depositing techniques and non-soot depositing techniques.

20. A method as claimed in claim 18, wherein said consolidation is by heating with a flame hydrolysis burner and/or in a furnace.

21. A method as claimed in claim 20, wherein the formation of at least one of said at least one buffer layer (3), said first core layer (4), said at least one other core layer (5), and said upper cladding layer (8) comprises the steps of:
   depositing said layers of material by-means of a plasma enhanced chemical vapour deposition process, a low pressure chemical vapour deposition process and/or any other planar deposition technique or combination of deposition techniques;
   subjecting the deposited layer to a temperature controlled environment such that said deposited layer is sintered.

22. A method as claimed in claim 13, wherein the composition of at least one layer of said: first core layer (4), at least one other core layer (5), and/or said at least one upper cladding layer (8) includes silica and/or germanium oxide.

23. A method as claimed in claim 13, wherein at least one layer of said: first core layer (4), said at least one other core layer (5), and, or said at least one upper cladding layer (8) is doped with at least one ion species taken from the group consisting of:
   phosphorous, boron, titanium, tantalum, aluminum, lanthanum, niobium, zirconium and/or any other transition element.

24. A method as claimed in claim 23, wherein said at least one silica and/or germanium oxide layer is doped with at least one ion species taken from the group consisting of:
   a transition element, a rare earth ion species and/or a heavy metal ion species.

25. A method as claimed in claim 20, wherein the quantities of dopant are selected to form a waveguide with a refractive index difference of between 0.2–2% with respect to the buffer.

26. A method as claimed in claim 20, wherein the lower core layer is $SiO_2$ co-doped with a germanium and/or Boron and/or Phosphorus ion species.

27. A method as claimed in claim 20, wherein the upper core layer layer is $SiO_2$ co-doped with a Germanium and/or a Baron and/or Phosphorus ion species.

28. A method as claimed in claim 20, wherein the softening temperature $T_{2S}$ of the said at least one other core layer (5) is at least 10° C. less than the consolidating temperature $(T_{1C})$ of said first core later (4).

29. A method as claimed in claim 20, wherein the consolidation temperature $T_{1C}$ of said first core layer (4) is in the range 1200° C.–1375° C.

30. A method as claimed in claim 20, wherein the consolidation temperature $T_{2C}$ of the second core layer is between 1100° C. to 1365° C.

31. A method as claimed in claim 13, wherein the composition and concentration of dopants in any one lower layer and/or substrate is selected to control the degree of softness exhibited by any overlying layer at a predetermined temperature.

32. A method as claimed in claim 20, wherein during the consolidation the temperature conditions include a stage where the temperature gradient rises at 15° C. $min^{-1}$ between 650° C. to 850° C.

33. A method as claimed in claim 20 or claim 31, wherein during the consolidation the temperature conditions include a stage where the temperature gradient rises at 5° C. $min^{-1}$ between 850° C. to 1375° C., and the dopant concentrations are selectively controlled so that thermal deformation is minimised over this temperature range.

34. A method as claimed in claim 32 wherein during the consolidation the temperature conditions include a stage where the temperature gradient falls at 5° C. $min^{-1}$ between 1375° C. to 650° C.

35. A method as claimed in claim 31 wherein, during the consolidation stage of at least one of said cladding layer, said first core layer and/or said second core layer overlying doped substrate and/or another layer, the temperature conditions include a stage where the temperature remains above the softening temperature of the underlying substrate and/or other layer in its undoped state for at least 80 minutes.

* * * * *